(12) United States Patent
Kim et al.

(10) Patent No.: US 7,736,011 B2
(45) Date of Patent: Jun. 15, 2010

(54) LIQUID CRYSTAL DISPLAY

(75) Inventors: Jea Sang Kim, Gumi-si (KR); Seung Wook Yoo, Songpa-gu (KR)

(73) Assignee: LG Display Co., Ltd., Seoul (KR)

( * ) Notice: Subject to any disclaimer, the term of this patent is extended or adjusted under 35 U.S.C. 154(b) by 345 days.

(21) Appl. No.: 11/819,930

(22) Filed: Jun. 29, 2007

(65) Prior Publication Data
US 2008/0117631 A1 May 22, 2008

(30) Foreign Application Priority Data
Nov. 20, 2006 (KR) .................. 10-2006-0114581

(51) Int. Cl.
G09F 13/04 (2006.01)
G09F 13/08 (2006.01)
(52) U.S. Cl. .................. 362/97.2; 362/631; 362/634; 349/58

(58) Field of Classification Search ....... 362/97.1–97.4, 362/630–634; 349/58–60
See application file for complete search history.

(56) References Cited

U.S. PATENT DOCUMENTS
7,217,027 B2 * 5/2007 Jung et al. .................. 362/632

FOREIGN PATENT DOCUMENTS
JP 2005268028 A * 9/2005

* cited by examiner

*Primary Examiner*—Stephen F Husar
(74) *Attorney, Agent, or Firm*—McKenna Long & Aldridge LLP (57) ABSTRACT

A liquid crystal display for minimizing a leakage current to prevent brightness deterioration is disclosed. The liquid crystal display includes a backlight unit including a plurality of lamps, a plurality of lamp wires connected to the plurality lamps, and a bottom cover in which the lamps are received, the bottom cover having a plurality of holes through which the lamp wires are passed, an inverter circuit board generating a power to drive the lamps and a plurality of sockets connected to output terminals of the inverter circuit board and connecting to the lamp wires, wherein at least one socket among the sockets is inclined at a side of the inverter circuit board.

8 Claims, 6 Drawing Sheets

LIQUID CRYSTAL DISPLAY

This application claims the benefit of Korean Patent Application No. P2006-114581 filed in Korea on Nov. 20, 2006, which is hereby incorporated by reference for all purposes as if fully set forth herein.

BACKGROUND OF THE INVENTION

1. Field of the Invention

The present invention relates to a liquid crystal display, and more particularly to a liquid crystal display that is adaptive for minimizing a leakage current to prevent brightness deterioration.

2. Description of the Related Art

Generally, a liquid crystal display device is widely used due to its characteristics of light weight, thin profile, low power consumption, etc. As a result, the liquid crystal display device is used in office automation equipment, audio/video equipment, etc. The liquid crystal display device controls the amount of light in accordance with signals applied to a plurality of control switches that are arranged in a matrix to display a desired picture on a screen.

In this way, the liquid crystal display device is not a self luminous display device, thus it requires a separate light source such as a backlight unit.

The backlight unit is largely classified as an edge type and a direct type. Herein, the edge type backlight unit has a lamp which is installed at the end of one side of a liquid crystal display, and the direct type backlight unit has a lamp which is installed under the liquid crystal display.

Figure 1:
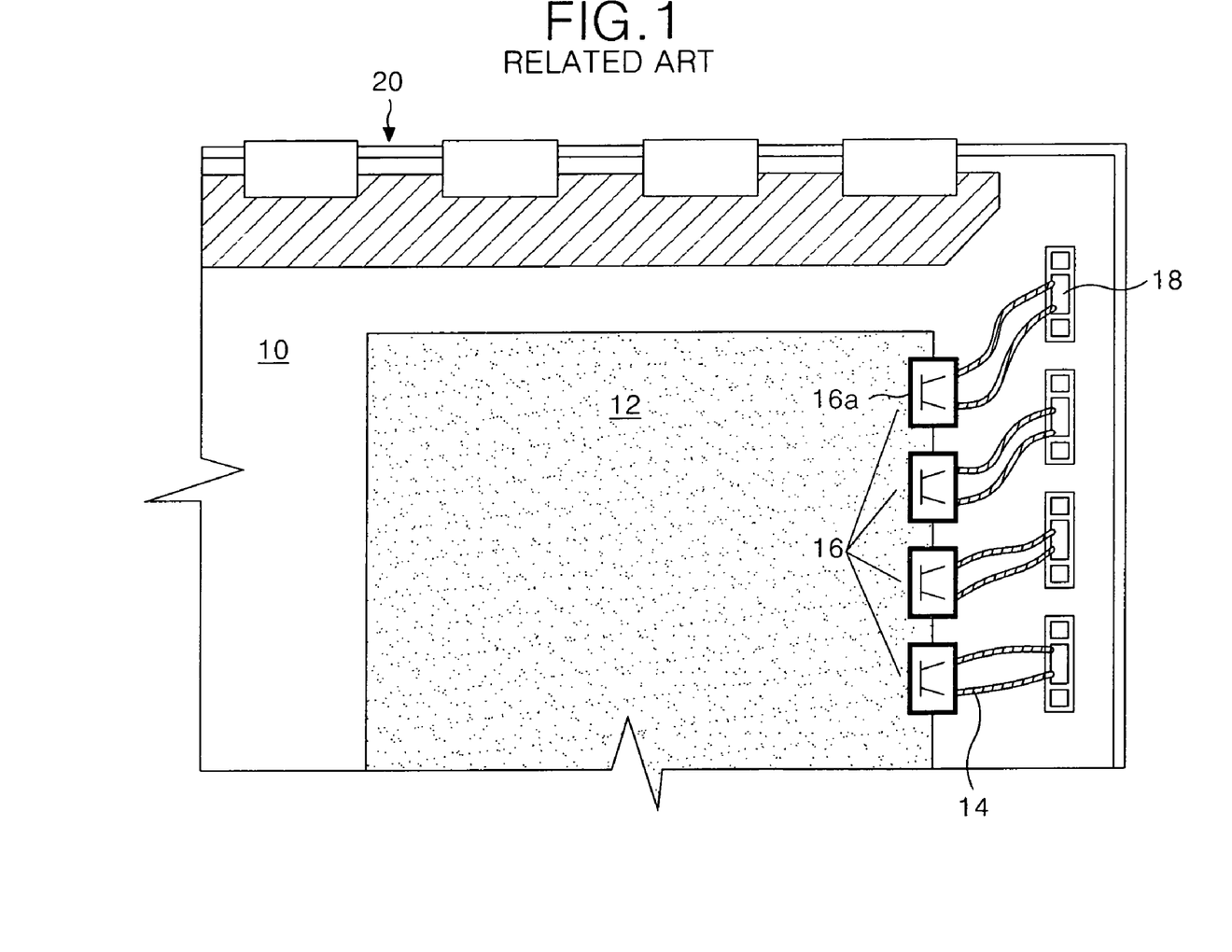
FIG. 1 is a perspective view showing a rear surface of a related art liquid crystal display.

FIG. 1 is a perspective view showing a rear surface of a related art liquid crystal display.

Referring to FIG. 1, a liquid crystal display with which the direct type backlight unit is applied, includes a plurality of lamps (not shown), an inverter circuit board 12 closely located at a rear surface of a bottom cover 10 and driving the lamps, and sockets 16 connecting lamp wires 14 to output terminals of the inverter circuit board 12. Herein, one end of the lamp wire 14 is connected to an electrode of the lamp.

The lamps are supplied with an AC power from the inverter circuit board 12 and emit a light. The inverter circuit board 12 is installed at the rear surface of the bottom cover 10 to convert a DC voltage into an AC voltage that is capable of driving the lamps, thereby outputting the AC voltage via the output terminal. The inverter circuit board 12 is also connected, via the sockets 16, to the lamp wires 14 connected to one ends of the lamps to apply the AC voltage to the lamps.

The lamp wires 14 are high-level voltage wires which are connected to the ends of the lamps. The lamp wires 14 are drawn out to the external of the bottom cover 10 via wire drawing out holes 18 and then are connected to the inverter circuit board 12 by the sockets 16. In this case, the wire drawing out holes 18 are formed at a support main. Herein, two lamp wires 14 are connected to one socket 16, respectively.

As described above, the lamp wires 14 must be drawn out toward the rear side of the bottom cover 10 to be connected to the inverter circuit board 12 so as to allow the inverter circuit board 12 to be electrically connected to the lamps. In this case, if a connection between the lamp wires 14 and the inverter circuit board 12 is tightened or is entangled each other, interference may be generated. To solve this problem, if a length of the lamp wire 14 is lengthened, an area that the lamp wire 14 is contacted with the bottom cover 10 made of a metal, is increased. As a result, an amount of the leakage current is increased.

Furthermore, a print circuit board 20 is located at an upper portion of the liquid crystal display. In this case, lengths of two lamp wires 14 connected to a first socket 16a are different from each other. Herein, the first socket 16a is formed at an upper corner where is closely located to the print circuit board 20. If the lengths of two lamp wires 14 are different from each other, the leakage current generated from each of the lamp wires 14 is differentiated. Thus, the brightness of the lamps changes and the screen blinks.

SUMMARY OF THE INVENTION

Accordingly, the present invention is directed to a liquid crystal display that substantially obviates one or more of the problems due to limitations and disadvantages of the related art.

An advantage of the present invention is to provide a liquid crystal display that is adaptive for minimizing a leakage current to prevent brightness deterioration.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes a backlight unit including a plurality of lamps, a plurality of lamp wires connected to the plurality of lamps, and a bottom cover in which the lamps are received, the bottom cover having a plurality of holes through which the lamp wires are passed; an inverter circuit board generating a power to drive the lamps; and a plurality of sockets connected to output terminals of the inverter circuit board and being capable of connecting to the lamp wires, wherein a posture of at least one socket among the sockets is different from postures of the other sockets.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to embodiments of the present invention, examples of which are illustrated in the accompanying drawings.

Figure 2:
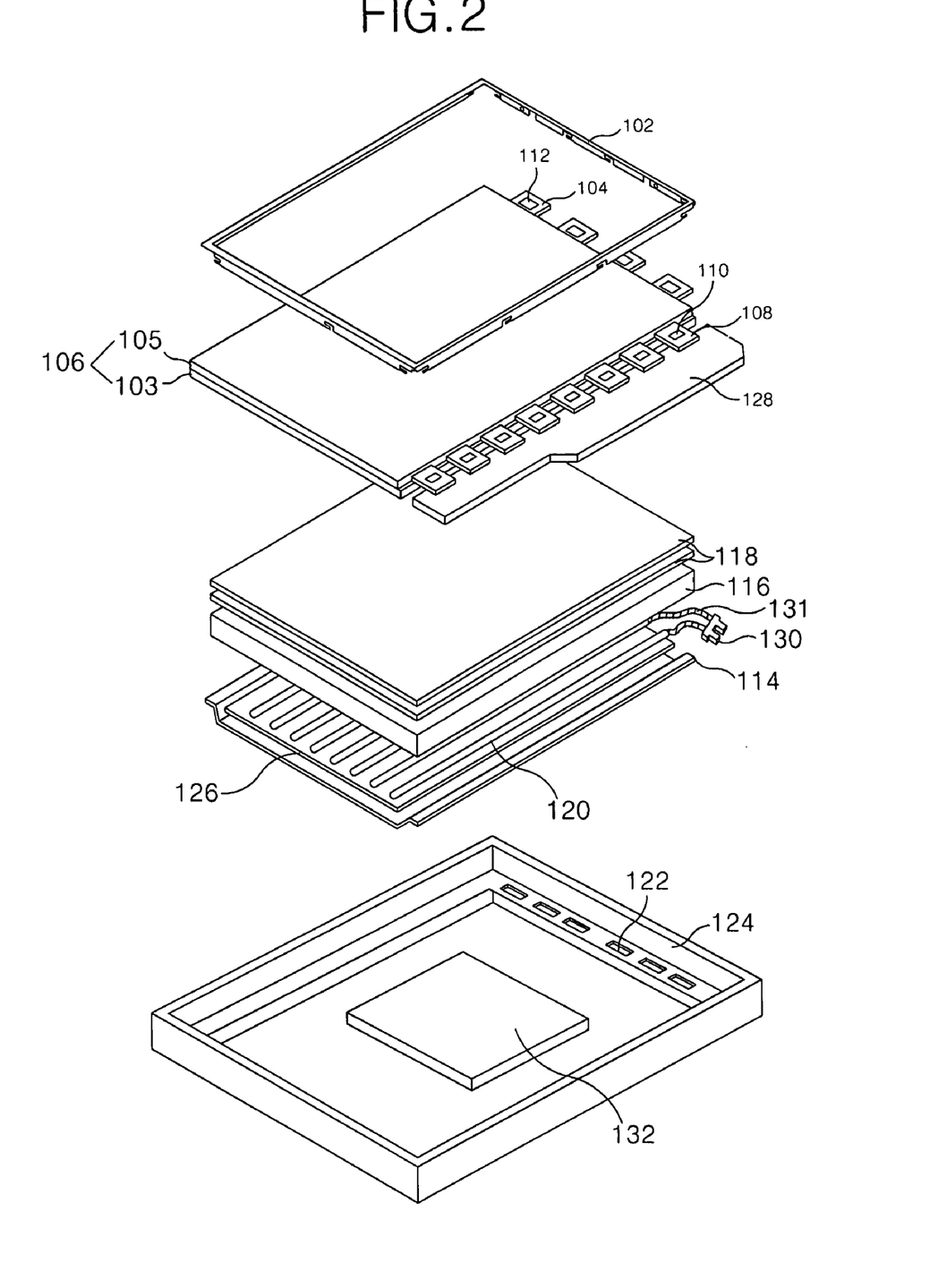
FIG. 2 is a perspective view showing a liquid crystal display according to a first embodiment of the present invention.
Figure 3A:
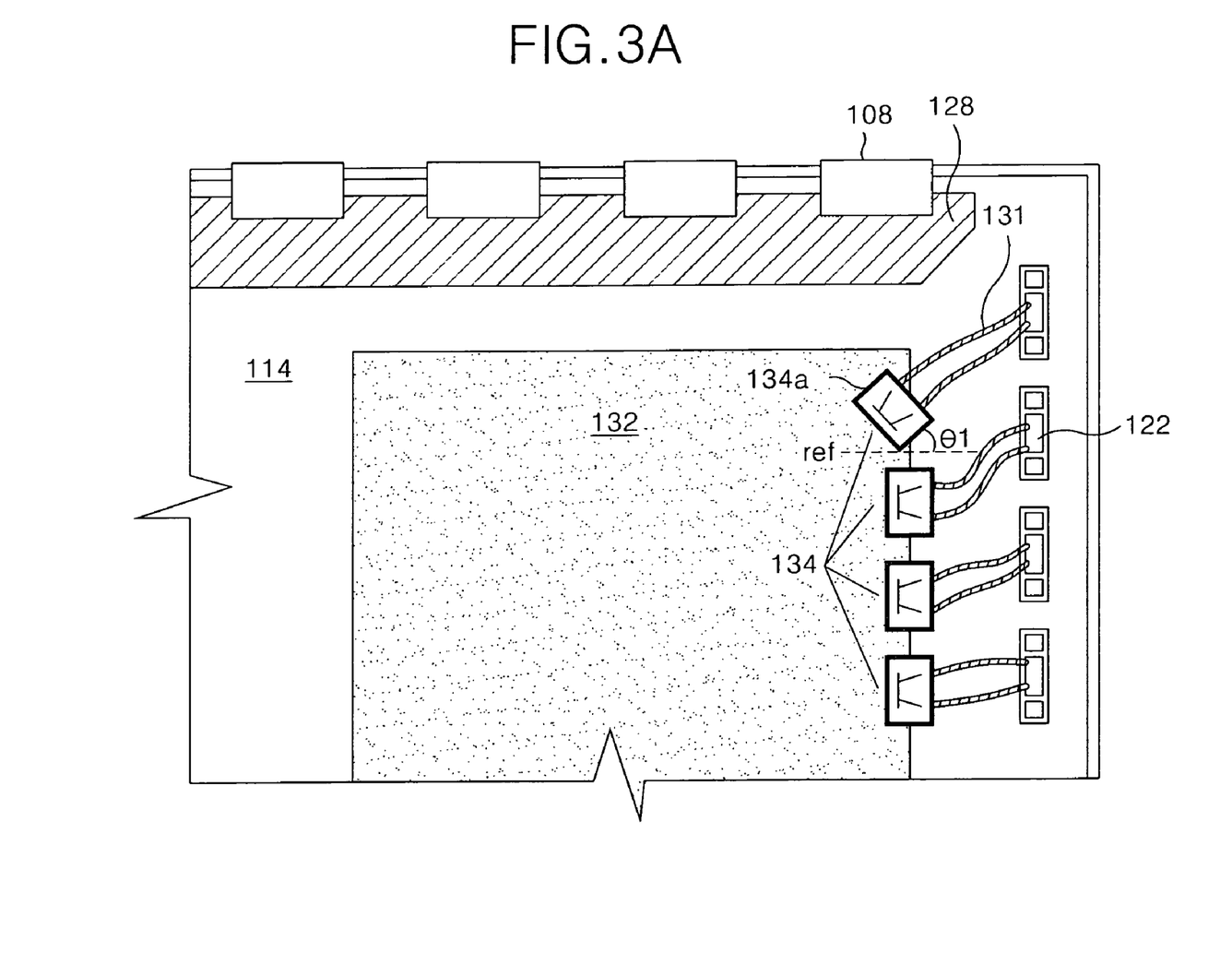
FIG. 3A is a perspective view showing a rear surface of the liquid crystal display shown in FIG. 2.
Figure 3B:
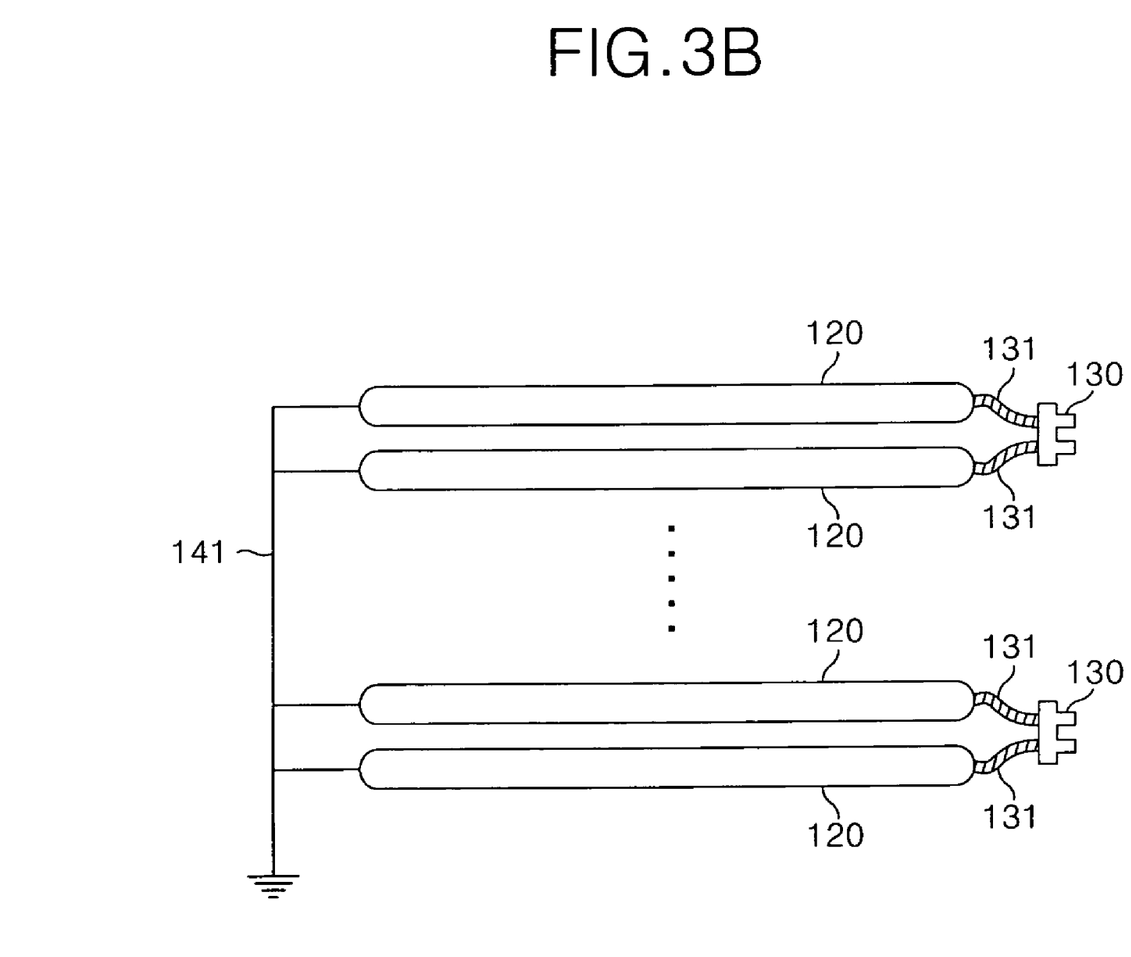
FIG. 3B is a schematic diagram showing a state that a plug connected to the socket shown in FIG. 3A is connected, via lamp wires, to a lamp.

FIG. 2 is a perspective view showing a liquid crystal display according to a first embodiment of the present invention, FIG. 3A is a perspective view showing a rear surface of the liquid crystal display in FIG. 2, and FIG. 3B is a schematic diagram showing a state that a plug connected to the socket in FIG. 3A is connected, via lamp wires, to a lamp.

Referring to FIG. 2, FIG. 3A, and FIG. 3B, the liquid crystal display according to the first embodiment of the present invention includes an uppermost first socket 134a to be inclined at a first angle θ1 to a horizontal reference line ref which is indicated by a dotted line. According to the construction, lengths of the two lamp wires 131 connected to the first socket 134a is substantially the same. The horizontal reference line ref is an imaginary reference line which is perpendicular to a vertical side surface where the output terminals are formed in the inverter circuit board 132.

The liquid crystal display of the present invention includes a support main 124, a backlight unit and a liquid crystal panel 106 which are disposed at the internal of the support main 124, and a top case 102 enclosing edges of the liquid crystal panel 106 and side surfaces of the support main 124.

The top case 102 encloses the edges of the liquid crystal panel 106 and the side surfaces of the support main 124.

The support main 124 is made from a mold material. And the backlight unit and the liquid crystal panel 106 are disposed at the internal of the support main 124. Wire drawing out holes 122 are formed the support main 124. Herein, the wire drawing out holes 122 draw out the lamp wires 131 to the rear surface of the bottom cover 114.

The liquid crystal panel 106 includes an upper substrate 105 and a lower substrate 103. A liquid crystal (not shown) is provided between the upper substrate 105 and the lower substrate 103 of the liquid crystal panel 106. The liquid crystal panel 106 includes also a spacer (not shown) to uniformly maintain a distance between the upper substrate 105 and the lower substrate 103.

A color filter (not shown), a common electrode (not shown), and a black matrix (not shown), etc are formed at the upper substrate 105 of the liquid crystal panel 106. Furthermore, a signal wire such as a data line (not shown) and a gate line (not shown), etc is formed at the lower substrate 103 of the liquid crystal panel 106. A thin film transistor (hereinafter, referred to as "TFT") is formed at an intersection of the data line and the gate line. The TFT switches a data signal to be transmitted from the data line to the liquid crystal cell in response to a scanning signal (gate pulse) from the gate line. A pixel electrode is formed at a pixel area between the data line and the gate line.

A data pad area and a gate pad area are formed at one end of the liquid crystal panel 106. In this case, the data pad area and the gate pad area are connected to the data lines and the gate lines, respectively. A plurality of tape carrier package 104 and 108 (hereinafter, referred to as "TCP") are attached to have the same distance in the data pad area and the gate pad area. The TCP 104 is a gate TCP which is attached to a gate pad on the lower substrate 103. The gate TCP 104 includes a gate drive integrated circuit 112. Herein, the gate drive integrated circuit 112 supplies a gate signal to the gate lines in response to a control signal from the print circuit board 128. The TCP 108 is a data TCP which is attached to a data pad on the lower substrate 103. The data TCP 108 includes a data drive integrated circuit 110. Herein, the data drive integrated circuit 110 supplies a video signal to the data lines in response to the control signal from the print circuit board 128.

The print circuit board 128 includes a timing controller. Herein, the timing controller is supplied with driving signals and image signals from a system (not shown) to control a drive timing of the data drive integrated circuit 110 and the gate drive integrated circuit 112.

The backlight unit includes a plurality of lamps 120 arranged in parallel to each other to irradiate a light to the liquid crystal panel 106, lamp wires drawn out from the lamps 120, a bottom cover 114 arranged at a rear surface of the plurality of lamps 120 to receive the plurality of lamps 120, a diffusion plate 116 diffusing a light incident from the lamps 120 to irradiate it to the liquid crystal panel 106, a plurality of optical sheets 118 disposed on the diffusion plate 116, an inverter circuit board 132 located at a rear surface of the bottom cover 114 to drive the lamps, and sockets 134 connecting the lamp wires 131 drawn out from the lamps 120 to the inverter circuit board 132. Among the sockets 134, a first socket 134a is connected to the two lamp wires 131 drawn out from an upper corner corresponding to the print circuit board 128, and is inclined at a first angle θ1 to the horizontal reference line ref.

A cold cathode fluorescent lamp (hereinafter, referred to as "CCFL") or an external electrode fluorescent lamp (hereinafter, referred to as "EEFL") are used for the lamps 120. Each of the plurality of lamps 120 includes a glass tube, inert gasses filled into an internal of the glass tube, and a cathode and an anode which are installed at both ends of the glass tube. The inert gasses are filled into the glass tube, and a phosphor is coated on an inner wall of the glass tube. The lamps 120 are driven by a power from the inverter circuit board 132 to generate a light.

The bottom cover 114 is arranged at a rear surface of the lamps 120 to receive the lamps 120. A reflection plate 126 is attached to an internal of the bottom cover 114 to transmit a light generated from the lamps 120 to the liquid crystal panel 106.

The diffusion plate 116 uniformly diffuses the light from the lamps 120 to a large area to irradiate it to the liquid crystal panel 106. A member for diffusing a light is coated on both surfaces of a film which is made of a transparent resin, to form the diffusion plate 116.

The plurality of optical sheets 118 converts a path of the light radiated from the diffusion plate 116 to be vertical to the liquid crystal panel 106, thereby improving an efficiency of a light irradiated to the liquid crystal panel 106.

The inverter circuit board 132 is installed under the backlight unit, that is, under the rear surface of the bottom cover 114. The inverter circuit board 132 converts a DC voltage into an AC voltage, and boosts it up to generate an AC voltage driving the lamps 120. Output terminals of the inverter circuit board 132 are connected to the sockets 134 to which one ends of lamp wires 131 are connected. The other ends of the lamp wires 131 are connected to an electrode of the lamps 120. Accordingly, the AC voltages generated from the inverter circuit board 132 are applied, via the sockets 134 and the lamp wires 131, to the electrodes of the lamps 120.

Referring to FIG. 3B, each lamp wire 131 includes one end connected to one electrode of the lamp 120 and the other end connected to a plug 130 to be coupled to the socket 134. The other electrode of the lamp is grounded by another lamp wire 141. The plugs 130 and the lamp wires 131 are passed through the bottom cover 114 via the wire drawing out hole 122 formed at the support main 124 to be connected to the socket portions 134. The two lamps 120 are connected, via one plug 130, to each of the sockets 134, respectively. Accordingly, if the number of the lamps is fourteen, the seven sockets 134 are required.

As shown FIG. 3A, the first socket 134a of the sockets 134 is connected to the lamp wires 131 drawn out from the wire drawing out hole 122 of the upper corner. In this case, the wire drawing out hole 122 of the upper corner is closely located with the print circuit board 128. The first socket 134a is connected to the inverter circuit board 132 to allow a side surface thereof to be inclined at the first angle θ1 to the horizontal reference line ref. It is desirable that the first angle θ1 is set at an angle in a range of 30° to 60° to allow lengths of the two lamp wires 131 to be the same. Herein, the first socket 134a connects two lamp wires 131 to the two lamps 120.

As described above, when the first socket 134a is installed on the inverter circuit board 132 to have a predetermined angle to the horizontal reference line ref, it is possible to decrease the lengths of the two lamp wires 131 connected to the first socket 134a, thus the lengths of the two lamp wires 131 are the same. As a result, a leakage current difference caused by a length difference of the two lamp wires 131 is reduced, and a leakage current can be reduced by a length decrease of the lamp wires 131. Thus, a blinking of the lamps 120 or a deterioration of brightness can be minimized or prevented.

Figure 4:
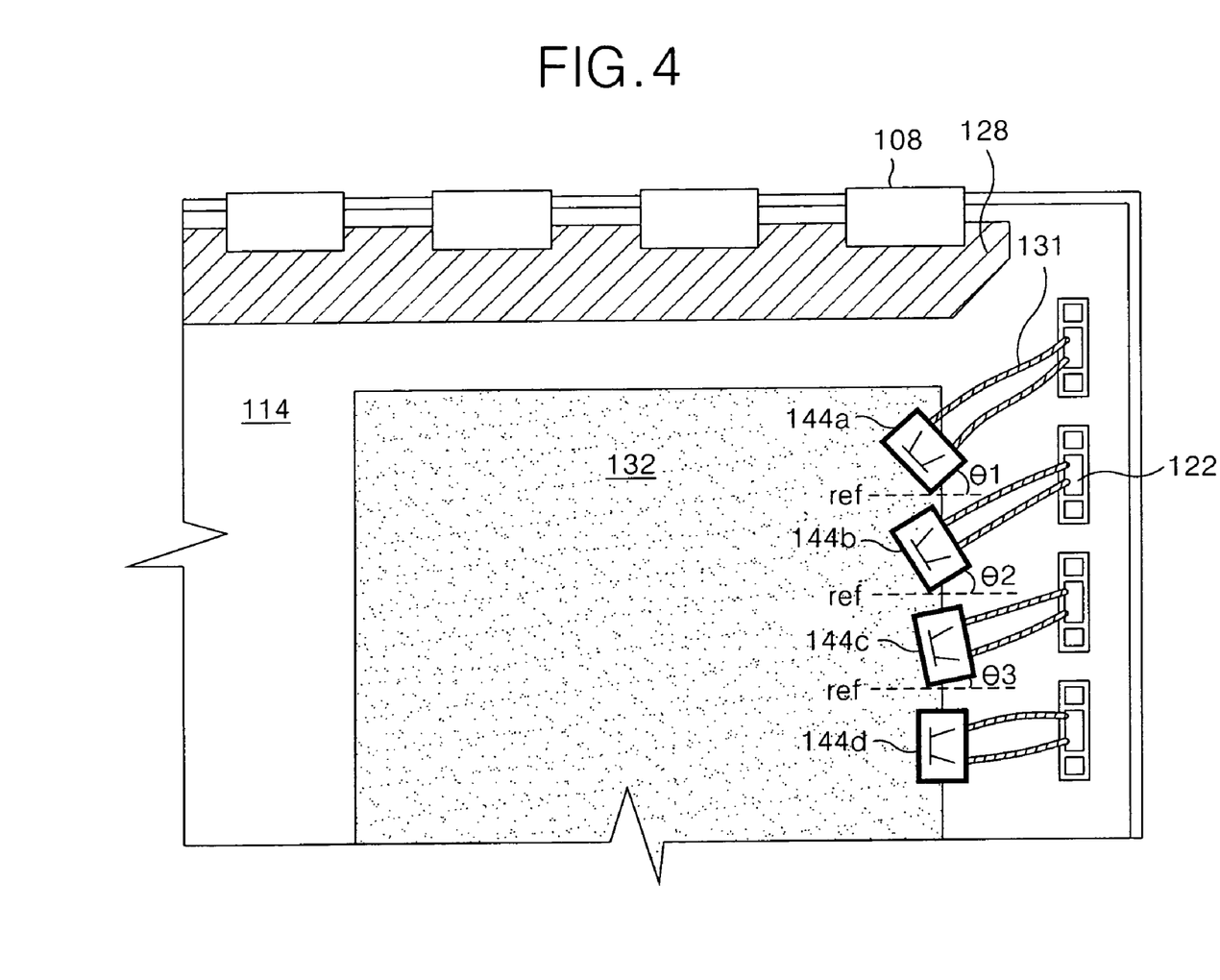
FIG. 4 is a perspective view showing a rear surface of a liquid crystal display according to a second embodiment of the present invention.

FIG. 4 is a perspective view showing a rear surface of a liquid crystal display according to a second embodiment of the present invention.

Referring to FIG. 2 and FIG. 4, a liquid crystal display according to the second embodiment of the present invention includes lamp wires 131 drawn out from lamps 120, a inverter circuit board 132 closely arranged at the rear surface of a bottom cover 114 to drive the lamps 120, and sockets 144a, 144b, and 144c connecting the lamp wires 131 drawn out from the lamps 120 to the inverter circuit board 132 and inclined at predetermined angles to a horizontal reference line ref.

As shown in FIG. 4, the first socket 144a is connected in a posture that a side surface thereof is inclined to have the first angle θ1 to the horizontal reference line ref, to the inverter circuit board 132. The second socket 144b is located under the first socket 144a and is connected to the inverter circuit board 132 in a posture that a side surface thereof is inclined to have a second angle θ2 to the horizontal reference line ref. The third socket 144c is located under the second socket 144b and is connected to the inverter circuit board 132 in a posture that a side surface thereof is inclined to have a third angle θ3 to the horizontal reference line ref. At least one socket 144d is located under the third socket 144c, and the socket 144d is connected to the inverter circuit board 132 in a posture that side surfaces thereof are in parallel to the horizontal reference line ref.

It is desirable that the first angle θ1 is set at an angle in a range of 30° to 60° to allow lengths of the two lamp wires 131 between the first socket 144a and the two lamps 120 to be the same. It is desirable that the second angle θ2 is set at an angle in a range of 10° to 30° narrower than the first angle θ1 to allow lengths of the two lamp wires 131 between the second socket 144b and the two lamps 120 to be the same. It is desirable that the third angle θ3 is set at an angle in a range of 1° to 10° narrower than the second angle θ2 to allow lengths of the two lamp wires 131 between the third socket 144c and the two lamps 120 to be the same.

Figure 5:
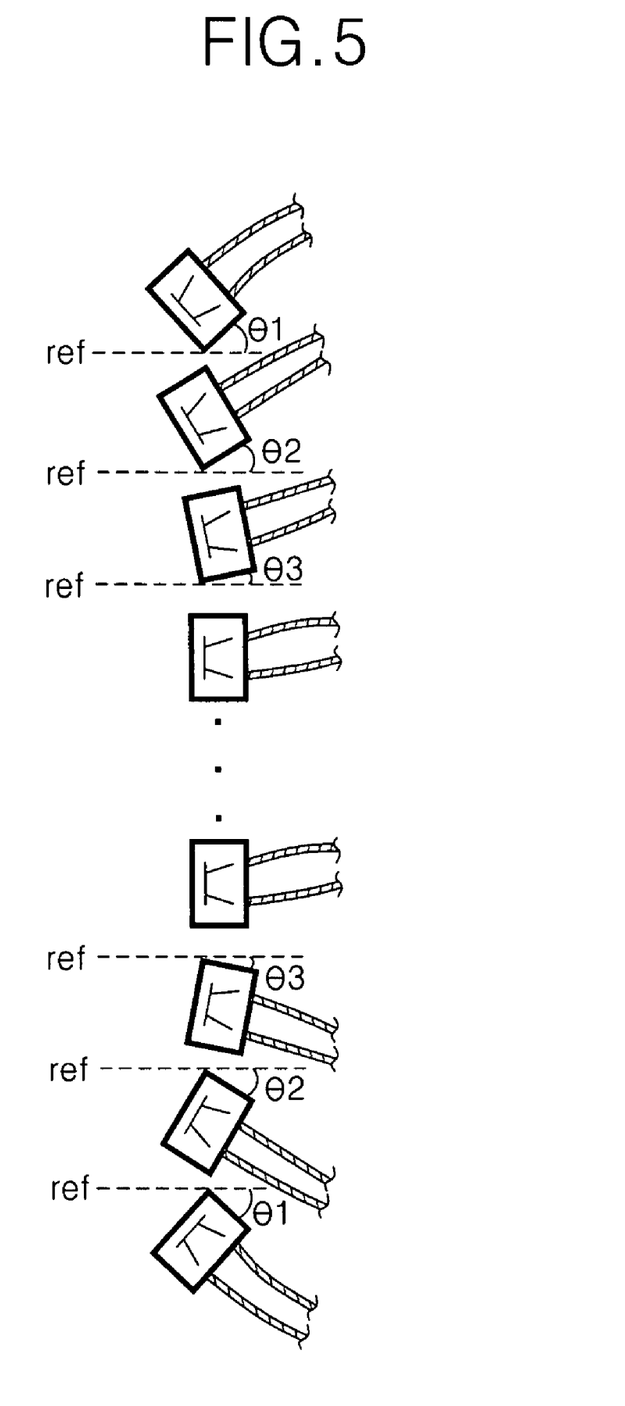
FIG. 5 is a perspective view showing a rear surface of a liquid crystal display according to a third embodiment of the present invention.

The second embodiment of the present invention discloses that postures of the three sockets 144a, 144b, and 144c installed at the upper portion of the liquid crystal display are inclined. As shown in FIG. 5, it is possible that at least two sockets located at the upper portion of the liquid crystal display and at least two sockets located at the lower portion of the liquid crystal display may be symmetrically connected to each other to the inverter circuit board 132.

As described above, the liquid crystal display according to the present invention adjusts a posture of at least one socket connected to the output terminal of the inverter circuit board to allow the lengths of the lamp wires between the sockets and the lamps to be decreased and be the same. Accordingly, the liquid crystal display according to the present invention can reduce a difference of a leakage current generated by the lamp wires which have the same length and can minimize the leakage current. Furthermore, the liquid crystal display according to the present invention can minimize or prevent a blinking of the lamps or a deterioration of brightness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a backlight unit including a plurality of lamps, a plurality of lamp wires connected to the plurality lamps, and a bottom cover in which the lamps are received, the bottom cover having a plurality of holes through which the lamp wires are passed;
   an inverter circuit board generating a power to drive the lamps; and
   a plurality of sockets connected to output terminals of the inverter circuit board and connected to the lamp wires,
   wherein at least one socket among the sockets is inclined at a side of the inverter circuit board.

2. The liquid crystal display as claimed in claim 1, wherein the at least one socket is connected to the inverter circuit board at an angle in a range of 30° to 60° to the side of the inverter circuit board.

3. The liquid crystal display as claimed in claim 1, wherein the at least one socket is located at an upper portion among the sockets.

4. The liquid crystal display as claimed in claim 1, wherein the at least one socket includes:
   a first socket located at an uppermost portion among the sockets, and connected to the inverter circuit board which is inclined to have a first angle to the side of the inverter circuit board;
   a second socket located under the first socket, and connected to the inverter circuit board which is inclined to have a second angle narrower than the first angle to the side of the inverter circuit board; and
   a third socket located under the second socket, and connected to the inverter circuit board which is inclined to have a third angle narrower than the second angle to the side of the inverter circuit board.

5. The liquid crystal display as claimed in claim 4, wherein the first angle range is about 30° to 60°.

6. The liquid crystal display as claimed in claim 4, wherein the second angle range is about 10° to 30°.

7. The liquid crystal display as claimed in claim 4, wherein the third angle range is about 1° to 10°.

8. The liquid crystal display as claimed in claim 1, wherein the at least one socket includes:

a first socket located at an uppermost portion, and connected to the inverter circuit board which is inclined to have a first angle to the side of the inverter circuit board;

a second socket located under the first socket, and connected to the inverter circuit board which is inclined to have a second angle narrower than the first angle to the side of the inverter circuit board;

a third socket located under the second socket, and connected to the inverter circuit board which is inclined to have a third angle narrower than the second angle to the side of the inverter circuit board;

a fourth socket located at a lowermost portion, and connected to the inverter circuit board which is inclined to have a first angle to the side of the inverter circuit board;

a fifth socket located on the fourth socket, and connected to the inverter circuit board which is inclined to have the second angle to the side of the inverter circuit board; and a sixth socket located on the fifth socket, and connected to the inverter circuit board which is inclined to have the third angle to the side of the inverter circuit board.

* * * * *